United States Patent Office 3,475,516
Patented Oct. 28, 1969

3,475,516
CLEAR AND IMPACT RESISTANT BLENDS OF RESINOUS AND RUBBERY POLYMERS PARTLY COMPATIBLIZED BY A GRAFTING POLYMER
Richard G. Bauer and Nelson C. Bletso, Kent, and William C. Mast, Stow, and Robert M. Pierson, Hudson, Ohio, assignors to The Goodyear Tire & Rubber Company, Akron, Ohio, a corporation of Ohio
No Drawing. Continuation-in-part of application Ser. No. 395,923, Sept. 11, 1964. This application Mar. 16, 1967, Ser. No. 623,552
Int. Cl. C08f 37/18, 41/12
U.S. Cl. 260—876   11 Claims

ABSTRACT OF THE DISCLOSURE

Discloses transparent and impact resistant blends of clear resinous polymers and clear rubbery polymers made partly compatible with each other by grafting to one of the polymers a clear grafting polymer of substantially the same composition as the non-grafted polymer, the grafted polymer and the non-grafted polymer having substantially the same refractive index, the resinous, rubbery and grafting polymers each comprising a mixture of molecules each of which has substantially the same composition and copolymers resulting from the polymerization of a mixture of at least two monomers constantly present in the mixture in the same ratio and wherein the resinous and grafting polymers may also be homopolymers.

---

This application is a continuation-in-part application of our application Ser. No. 395,923 filed Sept. 11, 1964 now abandoned.

This invention relates to a transparent, heat and impact resistant resinous composition and to a method for its manufacture.

Conventional glass, made primarily of a mixture of silicates, is a hard, amorphous, transparent and brittle material. Man has long sought to reproduce this type of material having its desirable properties while eliminating the undesirable property of brittleness. For a possible solution to this problem the chemist has turned to the man-made polymers, particularly polymethyl methacrylate, and found that he had a substitute for glass having many of its desirable properties but was lacking in such properties as high softening point, high rigidity and resistance to fracture. Although some progress has been made in developing a substitute for glass using man-made polymers, considerable room still exists for improvement, particularly in regard to resistance to fracture by impact.

Clear polymers are known and are made, for example, from specific monomers selected in such a manner and combined in such proportions as to produce a polymer which will transmit light efficiently. For example, it is known to copolymerize alpha methylstyrene with acrylonitrile and methacrylonitrile, or an alkyl methacrylate in an azeotropic mixture to produce a clear polymer, but in most cases the polymer possesses no resistance to fracture, particularly when formed into a relatively thin sheet.

Many other azeotropic mixtures involving such monomers as styrene, vinyl toluene, vinyl styrene, alkyl methacrylates, acrylic acid, methacrylic acid, dialkyl fumarates, monoalkyl fumarates and monoalkyl maleates will produce clear polymers, but in all instances the resulting polymer has little or no resistance to fracture and attempts to blend these clear polymers with other polymers, plasticizers, solvent, fillers, dyes, stabilizers and the like invariably destroy the clarity of the polymer. Thus the attempt to improve the resistance to fracture of these polymers results in the loss of the clarity of the original polymer. It has now been discovered that a permanently transparent and high-impact resistant composition may be made by blending together at least two of these or other clear polymers each having substantially the same refractive index but different glass transformation temperatures (Tg) to provide impact resistance, and having a compatibilizing clear polymer grafted onto one of the clear polymers being blended.

The present invention provides a means for producing a degree of compatibility between the clear polymers being blended by grafting onto one of the components a clear polymer which is substantially of the same composition as the non-grafted clear polymer and present in an amount sufficient to produce the degree of compatibility desired so as to give a product having a flex modulus of at least 170,000 p.s.i., a Shore D hardness of at least 70, a tensile strength of at least 2,000 p.s.i., a notched Izod impact strength of at least 6 in. lbs., a light transmission efficiency of at least 75%, a haze value of not more than 20, and a heat distortion of at least 70° C. The clear grafting polymer functions to produce a degree of compatibility between the clear resinous and the clear rubbery polymers because the solubility parameter of the grafting polymer is substantially the same as the solubility parameter of the non-modified clear polymer which solubility factor in turn is related to polymer composition in most instances as shown in articles appearing in J. Appl. Chem., 3, 71–80 (1953) and in Plastics (London) 26, 107–110 (1961). The grafting polymer and the non-modified polymer also have substantially the same polarity. The requirements of cohesive energy density and polarity are met when both the grafting polymer and the non-modified polymer are made from the same monomers combined in substantially the same ratios. The 85/15 methyl methacrylate/styrene resinous copolymer is considered to be of substantially the same composition as the grafting polymer polymethylmethacrylate because each met the requirements of polarity and cohesive energy density.

Graphically the flow chart set forth below is self-explanatory showing in general the various steps that are to be taken in the production of the clear and shatterproof plastic of this invention.

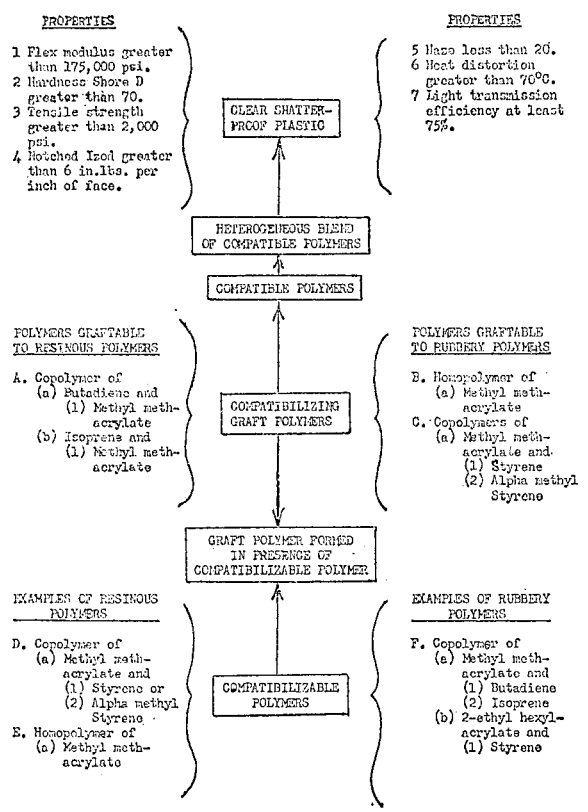

More specifically the present invention is directed to the blending of a clear rubbery copolymer resulting from the polymerization of a mixture comprising from 50 to 5 parts of methyl methacrylate and from 50 to 95 parts of butadiene, with at least one other polymer, for example, a clear resinous copolymer, resulting from the polymerization of a mixture comprising from 95 to 5 parts of methyl methacrylate and from 5 parts to 95 parts of styrene, wherein either the rubbery or the resinous clear polymer has grafted thereto a clear graft polymer which promotes the compatibility of these clear polymers when intimately mixed. The compatibilizing clear graft polymers that may be grafted to the clear resinous polymers are the clear copolymers resulting from the polymerization of a mixture comprising 95 to 5 parts of butadiene or isoprene and 5 parts to 95 parts of methyl methacrylate. The compatibilizing clear graft polymers that may be grafted to the clear rubbery polymers are the homopolymers of methyl methacrylate as well as the clear copolymers resulting from the polymerization ef a mixture comprising 5 to 95 parts of methyl methacrylate and from 95 to 5 parts of styrene, or a methyl styrene. All parts indicated throughout are per 100 parts of monomers reacted.

Clear copolymers are made in a conventional manner as described; for example, in Chemical Reviews 46, 191 (1950); Journal Polymer Science 26, 9–22 (1957); Journal of Applied Polymer Science 5, 337–348 (1961); U.S. Patents 2,851,446; 2,851,447; 2,851,448; 2,984,650; 2,984,651; and British Plastics pp. 552 to 525 (December 1958).

The amount of clear graft polymer that may be grafted, or added to the clear resinous polymer may range from about 15 parts to about 30 parts per 100 parts of resinous polymer and the amount of graft polymer that may be grafted to the rubbery polymer may range from about 10 parts to about 35 parts per 100 parts of clear rubbery polymer. More specifically the amount of clear polymer that may be grafted to the clear rubbery polymer, or added to the clear resinous polymer may range from about 20 to about 25 parts per 100 parts of clear rubbery or clear resinous polymer being compatibilized by the clear graft polymer.

The amount of clear grafted, or modified resin component to be blended with the clear unmodified rubber compoennt may range from 1 to 6 parts per part of unmodified rubber and the amount of unmodified resin to be blended with the grafted rubber may range from 1 to 5 parts per part of unmodified resin. The resulting blends will range from flexible to stiff depending upon the amount of resin component present in the blend.

Examples of clear rubbery polymers which may be used in producing the clear, shatter-proof plastic of this invention are clear copolymers resulting from the polymerization of a mixture comprising from 50 to 5 parts of methyl methacrylate and from 50 to 95 parts of butadiene and/or isoprene, each monomer being present per 100 parts of monomers present. Other clear rubbery polymers that may be used are the copolymers resulting from the polymerization of a mixture comprising from 50 to 95 parts of 2-ethyl hexylacrylate and from 50 to 5 parts of styrene, the monomers being present per 100 parts of monomers used.

Examples of clear resinous polymers that may be used in the present invention and which may be made compatible with the clear rubbery polymers hereinbefore described are the clear copolymers resulting from the polymerization of a mixture comprising 50 to 95 parts of methyl methacrylate and from 50 to 5 parts of styrene, and/or alpha-methyl styrene, wherein the monomers are present per 100 parts of monomers used. Another example of a clear resinous polymer is the homopolymer resulting from the polymerization of methyl methacrylate.

The following table sets forth Tg values for representative polymers in the rubbery and in the resinous classes described above. Azeotropic polymeric compositions are calculated in the conventional manner as shown, for example, in JACS 66, 2050 (1944).

TABLE I

| Polymer | Tg Value, °F. |
|---|---|
| Methyl methacrylate/butadiene (azeotrope 48/52): | |
| 1. (10/90) | −103 |
| 2. (20/80) | −70 |
| 3. (30/70) | −60 |
| 4. (40/60) | −27 |
| 5. (50/50) | −8 |
| Methyl methacrylate/isoprene (azeotrope 39/61): | |
| 6. (10/90) | −81 |
| 7. (20/80) | −61 |
| 8. (30/70) | −40 |
| 9. (40/60) | −17 |
| 10. (50/50) | 10 |
| 2-ethyl hexylacrylate/styrene (azeotrope 12.5/87.5): | |
| 11. (90/10) | −51 |
| 12. (80/20) | −33 |
| 13. (70/30) | −8 |
| 14. (60/40) | 10 |
| 15. (50/50) | 34 |
| Methyl methacrylate/styrene (azeotrope 46/54): | |
| 16. (90/10) | 217 |
| 17. (80/20) | 217 |
| 18. (70/30) | 217 |
| 19. (60/40) | 217 |
| 20. (50/50) | 217 |
| Methyl methacrylate/alpha methyl styrene (azeotrope 59/41): | |
| 21. (90/10) | 234 |
| 22. (80/20) | 244 |
| 23. (70/30) | 256 |
| 24. (60/40) | 268 |
| 25. (50/50) | 279 |
| 26. Polymethyl methacrylate (isotactic) | 44 |
| 27. Polymethyl methacrylate (atactic) | 104 |

The following are a few examples of polymers made compatible by forming a resin in the presence of a rubber, the compatible polymer having a Tg value representing the rubber component and a Tg value representing the graft resin component.

1. Polymethyl methacrylate formed in the presence of methyl methacrylate/butadiene (10/90).
2. Polymethyl methacrylate formed in the presence of methyl methacrylate/butadiene (20/80).
3. Polymethyl methacrylate formed in the presence of methyl methacrylate/butadiene (30/70).
4. Polymethyl methacrylate formed in the presence of methyl methacrylate/butadiene (40/60).
5. Polymethyl methacrylate formed in the presence of methyl methacrylate/butadiene (50/50).
6. Polymethyl methacrylate formed in the presence of methyl methacrylate/isoprene (10/90).
7. Polymethyl methacrylate formed in the presence of methyl methacrylate/isoprene (20/80).
8. Polymethyl methacrylate formed in the presence of methyl methacrylate/isoprene (30/70).
9. Polymethyl methacrylate formed in the presence of methyl methacrylate/isoprene (40/60).
10. Polymethyl methacrylate formed in the presence of methyl methacrylate/isoprene (50/50).
11. Polymethyl methacrylate formed in the presence of 2-ethyl hexylacrylate/styrene (90/10).
12. Polymethyl methacrylate formed in the presence of 2-ethyl hexylacrylate/styrene (80/20).
13. Polymethyl methacrylate formed in the presence of 2-ethyl hexylacrylate/styrene (70/30).
14. Polymethyl methacrylate formed in the presence of 2-ethyl hexylacrylate/styrene (60/40).
15. Polymethyl methacrylate formed in the presence of 2-ethyl hexylacrylate/styrene (50/50).
16. Methyl methacrylate/styrene 50/50 copolymer formed in the presence of methyl methacrylate/butadiene (10/90).
17. Methyl methacrylate/styrene 50/50 copolymer formed in the presence of methyl methacrylate/butadiene (20/80).
18. Methyl methacrylate/styrene 50/50 copolymer formed in the presence of methyl methacrylate/butadiene (30/70).
19. Methyl methacrylate/styrene 50/50 copolymer formed in the presence of methyl methacrylate/butadiene (40/60).
20. Methyl methacrylate/styrene 50/50 copolymer formed in the presence of methyl methacrylate/butadiene (50/50).
21. Methyl methacrylate/styrene 50/50 copolymer formed in the presence of methyl methacrylate/isoprene (10/90).
22. Methyl methacrylate/styrene 50/50 copolymer formed in the presence of methyl methacrylate/isoprene (20/80).
23. Methyl methacrylate/styrene 50/50 copolymer formed in the presence of methyl methacrylate/isoprene (30/70).
24. Methyl methacrylate/styrene 50/50 copolymer formed in the presence of methyl methacrylate/isoprene (40/60).
25. Methyl methacrylate/styrene 50/50 copolymer formed in the presence of methyl methacrylate/isoprene (50/50).
26. Methyl methacrylate/styrene 50/50 copolymer formed in the presence of 2-ethyl hexylacrylate/styrene (90/10).
27. Methyl methacrylate/styrene 50/50 copolymer formed in the presence of 2-ethyl hexylacrylate/styrene (80/20).
28. Methyl methacrylate/styrene 50/50 copolymer formed in the presence of 2-ethyl hexylacrylate/styrene (70/30).
29. Methyl methacrylate/styrene 50/50 copolymer formed in the presence of 2-ethyl hexylacrylate/styrene (60/40).
30. Methyl methacrylate/styrene 50/50 copolymer formed in the presence of 2-ethyl hexylacrylate/styrene (50/50).

An example of a clear, shatter-proof plastic that may be made in accordance with the present invention having high resistance to impact and the other properties listed in the chart above is made by blending 64 parts of an 85/15 methyl methacrylate/styrene copolymer with 36 parts of a 52/48 butadiene methyl methacrylate clear copolymer known as an azeotropic polymer to which butadiene methyl methacrylate clear copolymer is grafted 22 parts of methyl methacrylate for each 100 parts of clear rubbery copolymer as shown by Example III in Table 2.

The following example is exemplary of the clear resinous polymer that may be used as one of the components in making the clear shatter-proof plastic of this invention. All parts are by weight unless otherwise indicated.

Example I.—Resinous Polymer

The methyl methacrylate/styrene resin is made in accordance with the following formula.

| Ingredient | Purpose | Parts | Range |
|---|---|---|---|
| Water | Medium | 180 | 100–150 |
| Sodium salt of the phosphate ester of the condensate of nonylphenol and polyethylene oxide | Emulsifier | 4 | 1.5–12 |
| K$_2$S$_2$O$_8$ | Initiator | 0.20 | 0.02–0.5 |
| Methyl methacrylate | Monomer | 85.0 | |
| Styrene | do | 15.0 | |
| Terbutyl mercaptan | Modifier | 0.20 | 0–1.0 |
| Sodium dimethyl dithiocarbanate | Short-stopper | 0.50 | 0–1.0 |
| Tris (nonylphenoxy) phosphite | Antioxidant (as a dispersion) | 0.75 | 0–3.0 |
| 2-hydroxy-4-methoxy-benzophenone | UV stabilization (as a dispersion) | 0.75 | 0–3.0 |

The conditions of polymerization of the monomers listed above are any of those normally used in preparing emulsion polymers of this nature. For example, the first 3 components are charged to a glass lined reactor and the atmosphere in the reactor is flushed twice with nitrogen to which reactor then is added the next 3 components listed above. The reaction is carried on at a temperature of about 122° F. for a period of about 6 hours or until about 96% of the monomers are converted to polymers to form an emulsion containing about 34 solids. The reaction is then stopped by charging the reactor with the remainder of the components listed above.

The following example is exemplary of the rubbery polymer that may be used in combination with a resinous polymer in making the shatter-proof plastic of this invention.

Example II.—Rubbery Polymer

The butadiene/methyl methacrylate rubbery copolymer is made in accordance with the following formula.

| Ingredient | Purpose | Parts | Range |
|---|---|---|---|
| Water | Medium | 180 | 100-250 |
| Sodium salt of the phosphate ester of the condensate of nonylphenol and polyethylene oxide. | Emulsifier | 4.0 | 1.5-12 |
| $K_2S_2O_8$ | Initiator | 0.20 | 0.02-0.5 |
| Methyl methacrylate | Monomer (48%) | 37.0 | |
| Mixture of tert alkyl mercaptans | Modifier | 0.155 | 0.0-1.0 |
| Butadiene | Monomer (52%) | 41.0 | |
| Methyl methacrylate | Graft monomer (22%) | 22.0 | |
| Sodium dimethyl dithiocarbamate | Short-stopper | 0.50 | 0-1.0 |
| Tris (nonylphenoxy) phosphite | Antioxidant (as a dispersion) | 0.75 | 0.0-3.0 |
| 2-hydroxy-4-methoxy-benzophenone | UV stabilization (as a dispersion) | 0.75 | 0.0-3.0 |

The first 3 components are charged to a glass lined reactor and then flushed with nitrogen after which the next 3 components are charged to the reactor and reacted to 98% conversion in about 15 hours at a temperature of about 122° F. To this reaction mixture is then charged the methyl methacrylate monomer and the reaction continued until the graft polymer has been formed. To this graft polymer latex is then added the remainder of the components listed above.

Example III.—Resin/Rubber blending

The latices made in accordance with Examples I and II above are then coagulated in a 72/28 resin/rubber ratio in a 2% magnesium sulfate solution at 90° C., filtered and dried.

The 72/28 coagulated blend, made in the manner described above, is then milled at 325° F. for at least 1 minute to obtain a sheet of clear shatter-proof plastic.

The coagulated blend may also be calendered, injection molded, or extruded to obtain clear products. The physical properties of this sheeted resin is set forth under Example III in Table 2 below.

TABLE 2.—PHYSICAL PROPERTIES OF RESIN-RUBBER BLENDS

| | Rubber composition, Isop/Bd/MMA | Graft resin, percent graft (B) | Resin composition, MMA/S | Percent resin (C) | Resin intrinsic viscosity (P) | Refractive Index Na (D) Line 30°C. | | Transmission (E) | Haze (E) |
|---|---|---|---|---|---|---|---|---|---|
| | | | | | | Graft rubber | Resin | | |
| Example: | | | | | | | | | |
| III | 0/52/48 | 22 | 85/15 | 72 | 1.5 | 1.5030 | 1.5064 | 89.7 | 9 |
| IV | 0/52/48 | 22 | 85/15 | 66 | 1.5 | 1.5030 | 1.5064 | 89.8 | 9 |
| V | 0/52/48 | 22 | 85/15 | 75 | 1.5 | 1.5030 | 1.5064 | 89.8 | 9 |
| VI | 0/52/48 | 22 | 85/15 | 80 | 1.5 | 1.5030 | 1.5064 | 90.0 | 8.5 |
| VII Control | 0/52/48 | 0 | 85/15 | 72 | 0.76 | 1.5044 | 1.5064 | 87.2 | 38.0 |
| VIII | 0/52/48 | 10 | 85/15 | 72 | 0.76 | 1.5042 | 1.5064 | 90.6 | 11.2 |
| IX | 0/52/48 | 15 | 85/15 | 72 | 0.76 | 1.5039 | 1.5064 | 89.8 | 10.5 |
| X | 0/52/48 | 22 | 85/15 | 72 | 0.76 | 1.5030 | 1.5064 | 89.5 | 11.5 |
| XI | 0/52/48 | 27 | 85/15 | 72 | 0.76 | 1.5064 | 1.5064 | 88.6 | 6.0 |
| XII | 0/52/48 | 22 | 88.5/11.5 | 75(A) | 0.76 | 1.5030 | 1.5020 | 94.1(M) | 1.8(M) |
| XIII | 0/52/48 | 22 | 88.5/11.5 | 75(A) | 0.76 | 1.5030 | 1.5022 | 92.4(N) | 5.3(N) |
| XIV | 39/13/48 | 22 | 85/15 | 75 | 1.5 | | 1.5064 | 90.9 | 5.5 |
| XV | 52/0/48 | 22 | 85/15 | 75 | 1.5 | 1.5028 | 1.5064 | 89.8 | 6.9 |

| | Izod (notched) impact strength, in.lbs/in. Face (G) | Shore D Hardness (H) | Flexual modulus, p.s.i. (I) | Tensile strength, p.s.i. (J) | Heat Distortion | |
|---|---|---|---|---|---|---|
| | | | | | 264 p.s.i. (K) | 66 p.s.i. (L) |
| Example: | | | | | | |
| III | 44.5 | 80 | 197,000 | 3,100 | | 79 |
| IV | 66.0 | 74 | 112,000 | 1,950 | | 75.5 |
| V | 33.6 | 82 | 217,000 | 4,250 | | 82 |
| VI | 19.2 | 83 | 238,000 | 5,000 | | 89 |
| VII Control | 5.3 | 71 | 158,000 | 1,960 | 73 | |
| VIII | 37.0 | 75 | 171,000 | 3,290 | 73 | |
| IX | 15.0 | 77 | 183,000 | 3,560 | 75 | |
| X | 9.0 | 79 | 218,000 | 4,020 | 77 | |
| XI | 7.0 | 80 | 292,000 | 4,180 | 77 | |
| XII | | | | | | |
| XIII | | | | | | |
| XIV | 44 | 82 | 166,000 | 3,540 | 72 | |
| XV | 37 | 81 | 172,000 | 3,733 | 77 | |

Examples III through VII Latex Blend, pan dried, stabilized with 0.3 part 4,4-isopropylidene bis 2-n-butyl phenol and 0.3 part 2-hydroxy-4-methoxy benzophenone.
Examples VIII through XV Latex Blend, coagulate, pan dried, stabilized with 0.3 part mixture of styrenated phenols and 0.3 part tris (Nonylphenoxy) phosphite.
A, Methyl mehtacrylate/styrene 88.5/11.5 resinous copolymer.
B, Polymethyl methacrylate graft polymer.
C, Methyl methacrylate/styrene 85/15 resinous copolymer.
E, ASTM D-1003-52—Measurement determined on 1/16″ samples molded into tensile sheets between aluminum foil.
F, ASTM D-1003-52—Measurement determined on 1/16″ samples molded into tensile sheets between aluminum foil.
G, ASTM D-256-47T.
H, ASTM D-676-49T.
I, ASTM D-790-49T.
J, ASTM D-638-61T.
K, ASTM D-648-48T.
L, ASTM D-648-48T.
M, Measurement determined on 1/8″ samples molded between glass plates.
N, Measurement determined on 5/16″ samples molded between glass plates.
P, Intrinsic viscosity measured in chloroform at 25° C.

In Table 2 above Example VIII represents a control which is a non-grafted rubber/resin blend wherein the compatibility of the rubber for the resin was not adjusted through the use of a graft polymer and as a result the haze value increased to 38 even though the refractive index of the rubber and the resin were substantially the same and even more important the resistance to impact was markedly low. On the other hand Example IX shows the outstanding results obtained when the rubber is modified with 10% of the clear graft polymer polymethyl methacrylate which introduced a degree of compatibility which caused the Izod impact strength to reach the exceptionally high value of 37 and the haze value thereby reduced to 11.2 resulting in a light transmission of more than 90% while the other properties remained commercially acceptable.

Although it is preferred to cocoagulate the latices of the graft rubber and blending resin they may also be intermixed as by milling at temperatures above the heat distortion point of the materials being blended. Specifically the materials may be mixed in a Banbury for 5 minutes at a temperature of above 300° F., or on an open mill for at least 1 minute at about 300° F. After the graft rubber and the blending resin have been intermixed the resulting blended mass may then be sheeted by pressing between platens using aluminum foil to insure a high polish on the surfaces of the sheeted material. Other conventional methods for molding the blended materials may be used wherein high polish is insured on both surfaces of the sheeted plastic.

The transparent and impact resistance polymeric composition of this invention is basically represented by a polymeric composition comprising a partly compatible blend of a clear resinous polymer and a clear rubbery copolymer wherein each of the clear polymers used in the blend has substantially the same refractive index. In addition the composition of this invention is dependent upon the compatibility of one clear polymer for the other clear polymer and is adjusted by means of a clear polymer grafted to one of the clear polymers used in making the composition. It is also important in developing compatibility among the clear polymers that the clear graft polymer used is substantially of the same composition as the composition of the clear non-grafted polymer. Also it is important that the grafting operation be controlled in such a way as to insure a desirable distribution of the clear graft polymer on the backbone clear polymer and that the clear graft polymer be present in an amount sufficient to adjust the compatibility of one clear polymer for the other clear polymer to thereby insure the production of a transparent and impact resistant composition having a flex modulus of at least 170,000 p.s.i., a Shore D hardness of at least 70, a tensile strength of at least 2000 p.s.i., a notched Izod impact strength of at least 6 inch lbs., a haze value of not more than 20, a light transmission greater than 75%, and a heat distortion of at least 70.

In this regard, the examples set forth above represent combinations of clear rubber, clear grafting polymer and clear blending resin that will produce these desired results. In addition, Table 3 below is representative of additional clear rubbers, clear grafting polymers and clear resins blendable therewith that will produce, when made in accordance with conditions set forth above, a transparent and impact resistant polymeric composition of the type described herein. In Table 2 "Percent Resin" means total amount of resin in the blend including the resin grafted to the rubber, and "Percent Graft (B)" means amount of Graft (B) based on total grafted rubber.

TABLE 3.—PERCENT GRAFT (5 TO 30)

| Rubbers of— | Tg rubber, °F. | Graft polymers | Tg graft, °F. | Blend resins | Tg resins, °F. |
|---|---|---|---|---|---|
| (1) Butadiene | −120 | (1) MMA | 217 | (1) MMA/S | 217 |
| (2) Butadiene | −120 | (2) MMA/S | 217 | (2) MMA/S | 217 |
| (3) Butadiene | −120 | (3) MMA | 217 | (3) MMA/αMS | 217–279 |
| (4) Butadiene | −120 | (4) MMA/αMS | 234–279 | (4) MMA/αMS | 217–279 |
| (5) Butadiene | −120 | (5) MMA/EMA | 149–217 | (5) EMA/S | 149–217 |
| (6) Butadiene | −120 | (6) MMA/EMA | 149–217 | (6) EMA/αMS | 149–279 |
| (7) Butadiene | −120 | (7) EMA | 149 | (7) EMA/S | 149–217 |
| (8) Butadiene | −120 | (8) EMA | 149 | (8) EMA/αMS | 149–279 |
| (9) Butadiene | −120 | (9) EMA/S | 149–217 | (9) EMA/S | 149–217 |
| (10) Butadiene | −120 | (10) EMA/αMS | 149–279 | (10) EMA/αMS | 149–279 |
| (11) Butadiene | −120 | (11) MMA/IsopMA | 177–217 | (11) Isop/MA/S | 177–217 |
| (12) Butadiene | −120 | (12) MMA/IsopMA | 177–217 | (12) IsopMA/αMS | 177–249 |
| (13) Butadiene | −120 | (13) IsopMA | 177 | (13) IsopMA/S | 177–217 |
| (14) Butadiene | −120 | (14) IsopMA | 177 | (14) IsopMA/αMS | 177–279 |
| (15) Butadiene | −120 | (15) IsopMA/S | 177–217 | (15) IsopMA/S | 177–217 |
| (16) Butadiene | −120 | (16) IsopMA/αMS | 177–279 | (16) IsopMA/αMS | 177–279 |
| (17) Butadiene | −120 | (17) MMA/t-BMA | 217–224 | (17) t-BMA/S | 217–224 |
| (18) Butadiene | −120 | (18) MMA/t-BMA | 217–224 | (18) t-BMA/αMS | 224–279 |
| (19) Butadiene | −120 | (19) t-BMA | 224 | (19) t-BMA/S | 217–224 |
| (20) Butadiene | −120 | (20) t-BMA | 224 | (20) t-BMA/αMS | 224–279 |
| (21) Butadiene | −120 | (21) t-BMA/S | 217–224 | (21) t-BMA/S | 217–224 |
| (22) Butadiene | −120 | (22) t-BMA/αMS | 224–279 | (22) t-BMA/αMS | 224–279 |
| (23) Butadiene | −120 | (23) AN | 230 | (23) AN/S | 217–230 |
| (24) Butadiene | −120 | (24) AN | 230 | (24) AN/αMS | 230–279 |
| (25) Butadiene | −120 | (25) MMA/AN | 217–230 | (25) AN/S | 217–230 |
| (26) Butadiene | −120 | (26) MMA/AN | 217–230 | (26) AN/αMS | 230–279 |
| (27) Butadiene | −120 | (27) Isop/MA/AN | 177–230 | (27) AN/S | 217–230 |
| (28) Butadiene | −120 | (28) Isop/MA/AN | 177–230 | (28) AN/αMS | 230–279 |
| (29) Butadiene | −120 | (29) t-BMA/AN | 224–230 | (29) AN/S | 217–230 |
| (30) Butadiene | −120 | (30) t-BMA/AN | 224–230 | (30) AN/αMS | 230–279 |
| (31) Butadiene | −120 | (31) EMA/AN | 149–230 | (31) AN/S | 217–230 |
| (32) Butadiene | −120 | (32) EMA/AN | 149–230 | (32) αMS/AN | 230–279 |
| (33–64) Isoprene | −95 | 1–32 | | 1–32 | |
| (65–96) Bd/Isop | (−120) to −95 | 1–32 | | 1–32 | |
| (97–100) Bd/MMA | (−120) to 32 | 1–4 | | 1–4 | |
| (101–104) Isop/MMA | (−95 to 32) | 1–4 | | 1–4 | |
| (105–108) Bd/Isop/MMA | (−120) to 32 | 1–4 | | 1–4 | |
| (109–114) Bd/EMA | (−120) to 32 | 5–10 | | 5–10 | |
| (115–120) Isop/EMA | (−95) to 32 | 5–10 | | 5–10 | |
| (121–126) Bd/Isop/EMA | (−120) to 32 | 5–10 | | 5–10 | |
| (127–132) Bd/IsopMA | (−120) to 32 | 11–16 | | 11–16 | |
| (133–138) Isop/IsopMA | (−95) to 32 | 11–16 | | 11–16 | |
| (139–144) Bd/Isop/IsopMA | (−120) to 32 | 11–16 | | 11–16 | |
| (145–150) Bd/t-BMA | (−120) to 32 | 17–22 | | 17–22 | |
| (151–156) Isop/t-BMA | (−120) to 32 | 17–22 | | 17–22 | |
| (157–162) Bd/Isop/t-BMA | (−120) to 32 | 17–22 | | 17–22 | |
| (163–172) Bd/AN | (−120) to 32 | 23–32 | | 23–32 | |
| (173–182) Isop/AN | (−120) to 32 | 23–32 | | 23–32 | |
| (183–192) Bd/Isop/AN | (−120) to 32 | 23–32 | | 23–32 | |
| (193) 2-EHA/S | (−70) to 32 | (33) MMA | 217 | (33) MMA | 217 |
| (194) 2-EHA/S | (−70) to 32 | (34) MMA | 217 | (34) MMA/S | 217 |
| (195) 2-EHA/S | (−70) to 32 | (35) MMA/S | 217 | (35) MMA/S | 217 |
| (196) 2-EHA/S | (−70) to 32 | (36) MMA | 217 | (36) MMA/αMS | 217–279 |
| (197) 2-EHA/S | (−70) to 32 | (37) MMA/αMS | 217–279 | (37) MMA/αMS | 217–279 |
| (198) 2-EHA/S | (−70) to 32 | (38) EMA | 149 | (38) EMA | 149 |
| (199) 2-EHA/S | (−70) to 32 | (39) EMA | 149 | (39) EMA/S | 149–217 |
| (200) 2-EHA/S | (−70) to 32 | (40) EMA/S | 149–217 | (40) EMA/S | 149–217 |
| (201) 2-EHA/S | (−70) to 32 | (41) EMA | 149 | (41) EMA/αMS | 149–279 |
| (202) 2-EHA/S | (−70) to 32 | (42) EMA/αMS | 149–279 | (42) EMA/αMS | 149–279 |
| (203) 2-EHA/S | (−70) to 32 | (43) IsopMA | 177 | (43) IsopMA | 177 |
| (204) 2-EHA/S | (−72) to 32 | (44) IsopMA | 177 | (44) IsopMA/S | 177–217 |
| (205) 2-EHA/S | (−72) to 32 | (45) IsopMA/S | 177–217 | (45) IsopMA/S | 177–217 |

See footnotes at end of table

TABLE 3.—Continued

| Rubbers Of— | Tg rubber, °F. | Graft polymers | Tg graft, °F. | Blend resins | Tg resins °F |
|---|---|---|---|---|---|
| (206) 2-EHA/S | (−72) to 32 | (46) IsopMA | 177 | (46) IsopMA/αMS | 177-279 |
| (207) 2-EHA/S | (−72) to 32 | (47) IsopMA/αMS | 177-279 | (47) IsopMA/αMS | 177-279 |
| (208) 2-EHA/S | (−72) to 32 | (48) t-BMA | 224 | (48) t-BMA | 224 |
| (209) 2-EHA/S | (−72) to 32 | (49) t-BMA/S | 217-224 | (49) t-BMA/S | 217-224 |
| (210) 2-EHA/S | (−72) to 32 | (50) t-BMA | 224 | (50) t-BMA/αMS | 224-279 |
| (211) 2-EHA/S | (−72) to 32 | (51) t-BMA/αMS | 224-229 | (51) t-BMA/αMS | 224-279 |
| (212) 2-EHA/S | (−72) to 32 | (52) t-BMA | 224 | (52) t-BMA/S | 217-224 |
| (213) 2-EHA/S | (−72) to 32 | (53) AN | 230 | (53) AN/S | 217-230 |
| (214) 2-EHA/S | (−72) to 32 | (54) AN | 230 | (54) AN/αMS | 230-279 |
| (215) 2-EHA/S | (−72) to 32 | (55) MMA/AN | 217-230 | (55) MMA/AN | 217-230 |
| (216) 2-EHA/S | (−72) to 32 | (56) EMA/AN | 149-230 | (56) EMA/AN | 149-230 |
| (217) 2-EHA/S | (−72) to 32 | (57) t-BMA/AN | 224-230 | (57) t-BMA/AN | 224-230 |
| (218) 2-EHA/S | (−72) to 32 | (58) IsopMA/AN | 177-230 | (58) IsopMA/AN | 177-230 |
| (219–244) n-OA/S | (−112) to 32 | 33-58 | | 33-58 | 33-58 |
| (245–270) nBA/S | (−69) to 32 | 33-58 | | 33-58 | 33-58 |
| (271–296) n-Propyl A/S | (−49) to 32 | 33-58 | | 33-58 | 33-58 |
| (297–322) Isobutyl A/S | (−40) to 32 | 33-58 | | 33-58 | 33-58 |
| (323–348) EA/S | (−8) to 32 | 33-58 | | 33-58 | 33-58 |
| (349–374) n-Hexylmethacrylate/S | (−23) to 32 | 33-58 | | 33-58 | 33-58 |
| (375–400) Tetradecyl methacrylate/S | (16) to 32 | 33-58 | | 33-58 | 33-58 |
| (401–426) n-Octyl methacrylate/S | (−4) to 32 | 33-58 | | 33-58 | 33-58 |
| (427–452) n-Decyl methacrylate/S | (−76) to 32 | 33-58 | | 33-58 | 33-58 |

Bd=Butadiene.
Isop=Isoprene.
MMA=Methyl methacrylate.
S=Styrene.
αMS=Alpha methylstyrene.
EMA=Ethyl methacrylate.
IsopMA=Isopropyl methacrylate.
t-MBA=Tertiary-butyl methacrylate.
AN=Acrylonitrile.

2-EHA=2-ethyl hexylacrylate.
n-OA=Normal, octyl acrylate.
EA=Ethyl acrylate.
MA=Methacrylate.
BA=Butylacrylate.
A=Acrylate.
n-OMA=Normal-octylmethacrylate.
n-DMA=Normal-decylmethacrylate.

In addition to the rubbers listed above copolymers of any two of the following monomers may be copolymerized to form a rubber that may be used in the manner indicated above: 2-ethyl hexylacrylate, normal-octyl acrylate, normal-propyl acrylate, isobutyl acrylate, ethyl acrylate, normal-octyl methacrylate, normal-butyl acrylate, normal-hexylacrylate, normal-decyl methacrylate and styrene.

In those instances above where an azeotrope does not exit for the particular ratio disclosed, the copolymer is made by the conventional increment addition technique referred to above. The 90/10 methyl methacrylate/alpha methyl styrene copolymer was made as a constant composition, that is, where each molecule of the copolymer is of substantially the same composition in accordance with the following formulation:

Resinous copolymer of substantially constant composition

The copolymer of methyl methacrylate and alpha-methyl styrene was made using the following formulation:

| | Parts |
|---|---|
| (1) Water | 180 |
| (2) Emulsifier (same as Ex. 1) | 4 |
| (3) $K_2S_2O_8$ | .2 |
| (4) Methyl methacrylate | 94.2 |
| (5) Alpha-methyl styrene | 5.8 |
| (6) Terbutyl mercaptan | .57 |
| (7) Hydrogen peroxide (diluted to 5%), active | .65 |

Ingredients 1 through 6 were charged into a sealed reactor which had been evacuated and flushed twice with nitrogen and reacted under 20 p.s.i. of nitrogen. The reaction was carried to 37.5% solids while agitating and maintaining the reactants at a temperature of 122° F. To insure a 90/10 copolymer of constant composition, additional amounts of alpha-methyl styrene were added incrementally to the reactor as indicated below at the various percent conversions. After the reaction was completed and cooled to room temperature, hydrogen peroxide was added to the reactor to neutralize the catalyst while the reactor was agitated for 15 minutes more. The intrinsic viscosity of the resulting copolymer measured at 30° C. in $CHCl_3$, was 0.2.

| Percent conversion: | Part [1] of alpha methyl styrene |
|---|---|
| 5 | .540 |
| 10 | .489 |
| 15 | .464 |
| 20 | .440 |
| 25 | .415 |
| 30 | .390 |
| 35 | .368 |
| 40 | .341 |
| 45 | .315 |
| 50 | .290 |
| 55 | .264 |
| 60 | .239 |
| 65 | .213 |
| 70 | .187 |
| 75 | .161 |
| 80 | .135 |
| 85 | .109 |
| 90 | .083 |
| 95 | .054 |

[1] Based on 100 parts of total initial monomers charged.

Graft rubber

A graft rubber was made in accordance with the following formulation:

| | Parts |
|---|---|
| (1) Water | 100 |
| (2) Emulsifier (same as Ex. 1) | 4.0 |
| (3) $K_2S_2O_8$ | .2 |
| (4) Methyl methacrylate | 34.6 |
| (5) Terbutyl mercapton | .23 |
| (6) Butadiene-1,3 | 38.4 |
| (7) Methyl methacrylate | 27.0 |
| (8) Ethylene glycol dimethacrylate | .055 |
| (9) Hydrogen peroxide (diluted to 5%), active | .65 |

Reactants 1 through 5 above were charged to a sealed reactor which had been evacuated and flushed twice with nitrogen. Butadiene-1,3 was then added and the reaction carried to 30% solids at 122° F. under agitation. Ingredients 7 and 8 were then added and the reaction carried to 37% solids after which the contents of the reactor were cooled to room temperature and hydrogen peroxide then added while continuing to agitate the mixture for 15 minutes.

To 28 parts of graft rubber containing 27 parts of polymethyl methacrylate per 73 parts of rubber backbone was added 72 parts of the methyl methacrylate/alpha-methyl styrene 90/10 copolymer and coagulated in a 2% magnesium sulfate solution at 90° C., filtered and dried and milled at 325° F. for one minute into a clear shatterproof sheet having a white light transmission of 89.6% and a haze value of 10.1 both measured on a ⅛″ sheet molded between glass plates.

The transparent and impact resistant polymeric composition of the present invention may be used wherever clear sheet glass is used and wherever clear plastic material such as Lucite and similar materials are used. Of particular value is the fact that the material of the present invention may be used where impact resistance of the nature needed in advertising displays, transparent containers, and automobile tail light lenses and similar applications where the structure is liable to be subjected to a fracture producing blow. Also of value is the fact that the material of this invention may be injection molded, blow molded, extruded, calendered, or vacuum molded into transparent objects of intricate contour.

While certain representative embodiments and details have been shown for the purpose of illustrating the invention, it will be apparent to those skilled in this art that various changes and modifications may be made therein without departing from the spirit or scope of the invention.

What is claimed is:

1. A transparent and impact-resistant polymeric composition comprising a partly compatible blend of
    (A) a clear resinous polymer selected from the group consisting of a
        (I) clear copolymer comprising a mixture of molecules each of which has substantially the same composition and resulting from the polymerization of a mixture of at least 2 monomers
            (a) constantly present in the mixture in the same ratio and
            (b) selected from the group consisting of methyl methacrylate, styrene, alpha methylstyrene, ethyl methacrylate, tertiary butyl methacrylate, and acrylonitrile, and
            (c) present in a ratio of one monomer to another monomer of from 95:5 to 5:95 and
        (II) clear homopolymers thereof and
    (B) a clear rubbery polymer comprising a mixture of molecules each of which has substantially the same composition and resulting from the polymerization of a mixture of at least 2 monomers
            (a) constantly present in the mixture in the same ratio and
            (b) selected from the group consisting of n-octyl acrylate, methyl methacrylate, 2-ethyl hexylacrylate, n-butyl acrylate, n-propyl acrylate, isobutyl acrylate, ethyl acrylate, n-hexyl methacrylate, tetradecyl methacrylate, n-decyl methacrylate, butadiene, isoprene, styrene and alpha methyl styrene, and
            (c) present in a ratio of one monomer to another monomer of from 50:5 to 50:95,
    (C) the compatibility of the resinous polymer with the rubbery polymer being adjusted by modifying one of the said polymers by means of a clear grafting polymer grafted to said one polymer, the grafting polymer being selected from the group consisting of a
        (I) clear polymer resulting from the polymerization of a mixture of at least 2 monomers
            (a) constantly present in the mixture in the same ratio,
            (b) the monomers being selected from the group used in making said resinous and said rubbery polymers and
        (II) clear homopolymers thereof, (1) the clear grafting polymer having substantially the same composition as the non-modified polymer (2) the modified polymer having a refractive index substantially the same as the refractive index of the non-modified polymer (3) and the grafting polymer being present in an amount sufficient to adjust the compatibility of one polymer for the other polymer to produce said polymeric composition having
        (a) a flex modulus of at least 170,000 p.s.i.,
        (b) a Shore D hardness of at least 70,
        (c) a tensile strength of at least 2000 p.s.i.,
        (d) a clarity in terms of a white light transmission efficiency of at least 85%,
        (e) a haze value of not more than about 20 using white light measured through a 1/16" thickness of said polymeric composition,
        (f) a heat distortion of at least 70° C. measured at 264 p.s.i., and
        (g) a notched Izod impact strength of at least 30" lbs.
    (D) the ratio of modified polymer to non-modified polymer ranging from 1:1 to 5:1.

2. The polymeric composition of claim 1 wherein the composition of the clear resinous copolymer is substantially the same as the monomer mixture from which the clear resinous copolymer is made.

3. The polymeric composition of claim 2 wherein the composition of the clear rubbery copolymer is substantially the same as the monomer mixture from which the clear rubbery copolymer is made.

4. The polymeric composition of claim 3 wherein the composition of the clear grafting copolymer is substantially the same as the monomer mixture from which the clear grafting copolymer is made.

5. The composition of claim 1 wherein the resinous copolymer results from the polymerization of a mixture comprising about 15 parts by weight of styrene and about 85 parts by weight of methyl methacrylate.

6. The composition of claim 5 wherein the rubbery copolymer results from the polymerization of a mixture comprising about 48 parts by weight of methyl methacrylate, and about 52 parts by weight of butadiene.

7. The composition of claim 6 wherein the compatibility of the resinous polymer for the rubbery polymer is adjusted by grafting from about 10 to about 27 parts by weight of polymethyl methacrylate onto from about 90 to about 73 parts by weight of the rubbery copolymer.

8. The composition of claim 7 wherein from about 66 to about 80 parts by weight of both resinous and grafting polymers are present.

9. The composition of claim 7 wherein about 72 parts by weight of both resinous and grafting polymers are present.

10. The composition of claim 1 wherein the clear rubbery polymer is an azeotropic terpolymer of isoprene, butadiene and methyl methacrylate.

11. The composition of claim 1 wherein the clear rubbery polymer is an azeotropic copolymer of isoprene and methyl methacrylate.

References Cited

UNITED STATES PATENTS

| | | | |
|---|---|---|---|
| 3,009,895 | 11/1961 | Slocombe. | |
| 3,029,223 | 4/1962 | Hibbard | 260—880 |
| 3,073,798 | 1/1963 | Baer | 260—876 |
| 3,178,489 | 4/1965 | Lunk et al. | 260—880 |
| 3,198,775 | 8/1965 | Delacretaz et al. | |
| 3,261,887 | 7/1966 | Mann | 260—876 |

FOREIGN PATENTS

| | | |
|---|---|---|
| 638,546 | 4/1964 | Belgium. |
| 924,873 | 5/1963 | Great Britain. |
| 951,274 | 3/1964 | Great Britain. |
| 994,924 | 6/1965 | Great Britain. |

MURRAY TILLMAN, Primary Examiner

M. J. TULLY, Assistant Examiner

U.S. Cl. X.R.

260—879, 880, 881, 885

PO-1050
(5/69)

UNITED STATES PATENT OFFICE
CERTIFICATE OF CORRECTION

Patent No. 3,475,516  Dated October 28, 1969

Inventor(s) R. G. Bauer, N. C. Bletso, W. C. Mast & R. M. Pierson

It is certified that error appears in the above-identified patent and that said Letters Patent are hereby corrected as shown below:

Column 6, Example I, under Range, the first line reads "100-150" and should read --100-250--.

Column 8, Table 2, under Graft Rubber, Example XI, "1.5064" should read --1.5028--.

Columns 7 and 8, following Table 2, "4,4-isopropylidene bis 2-n-butyl phenol" should read -- 4,4'-isopropylidene bis 2-n-butyl phenol --.

Column 11, line 34, "exit" should read --exist--; line 68, "0.2" should read --0.7--.

Column 13, Claim 1, line 59, "polymer" should read --copolymer. line 63, following "the" second occurrence, should be inserted --same--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents